May 6, 1930.  F. J. BECHERT  1,757,699
SPRING END CONNECTION
Filed June 15, 1928
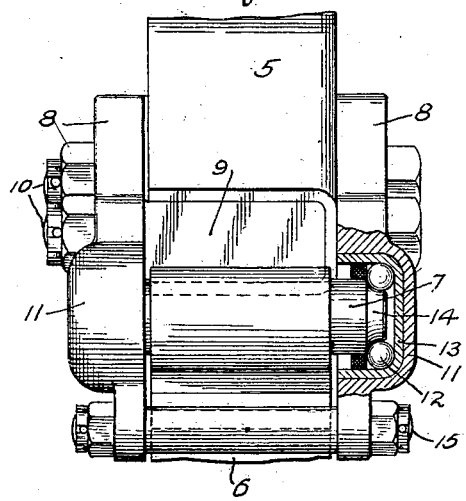
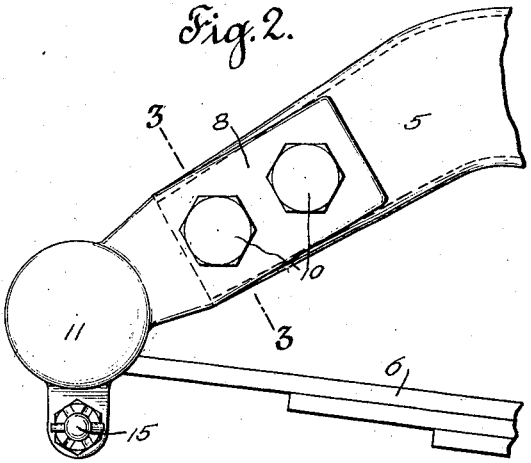
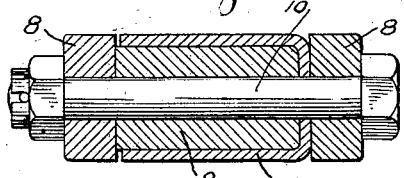
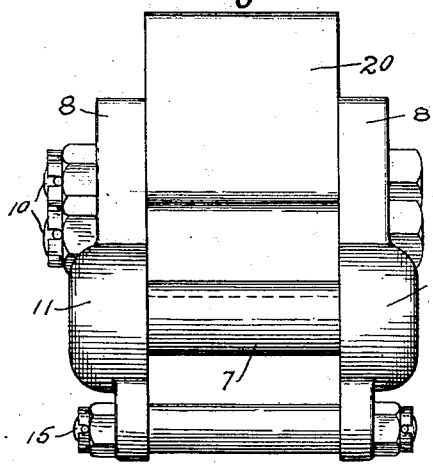
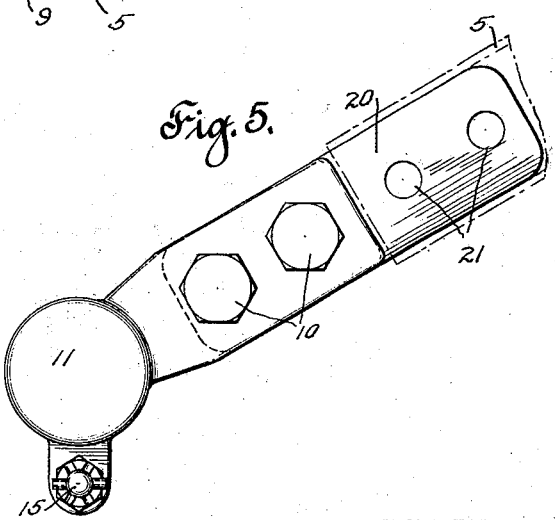
INVENTOR.
Fred J. Bechert
BY
ATTORNEYS.

Patented May 6, 1930

1,757,699

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

SPRING-END CONNECTION

Application filed June 15, 1928. Serial No. 285,578.

My invention relates to a spring end connection for connecting a vehicle frame and spring.

It is an object of the invention to provide a spring end connection which is simple in construction, cheap to manufacture, and which may be readily assembled, and in general the object is to provide an improved spring end connection for connecting a vehicle frame and spring.

Briefly stated, in the preferred form of the invention I employ separable plates to be rigidly secured to either the vehicle frame or the spring and definitely spaced apart thereby. The other member to be connected is provided with bearing means, for example, a bearing pin and antifriction bearing members such as balls or rollers are interposed between the side bearing members or plates, and the bearing means such as the pin on the other member. The parts may be very readily assembled and disassembled and when assembled, the frame and spring are securely connected together and the parts are automatically adjusted to the proper fit by the mere act of assembling.

In the drawings, which show for illustrative purposes only, preferred forms of the invention—

Fig. 1 is a fragmentary end view of a spring and frame connected by means of an improved spring end connection, part being shown in section to illustrate interior features;

Fig. 2 is a side view in elevation of parts in Fig. 1;

Fig. 3 is a sectional view taken substantially in the plane of the line 3—3 of Fig. 2;

Fig. 4 is a view similar to Fig. 1, but illustrating a slightly different embodiment;

Fig. 5 is a side view in elevation of parts shown in Fig. 4.

In said drawings, 5 indicates a vehicle frame while 6 indicates a spring to be connected thereto. One of the members, for example, the spring 6 is provided with bearing means such as a pin 7, the ends of which may and preferably do project beyond the sides of the spring. The other of said members in this instance the frame 5 has rigidly secured thereto separable side bearing members such as the side plates 8—8 which may be and preferably are substantial duplicates of each other. These plates 8—8 are preferably definitely spaced apart either by the frame alone or by the frame and a filler block 9 thereon. Means such as the through bolts 10—10 may be employed for securing the bearing plates 8—8 to the frame.

In the forms shown with a pin secured to one of the members such as the spring, the bearing plates 8—8 which project beyond the frame are provided at the projecting portions with end cups or bearing recesses such as 11 into which the projecting ends of the pin 7 extend. Antifriction bearing members such as balls 12—12 are interposed between the bearing members such as the pin 7 and the bearing members such as the plates 8—8. If desired a separate bearing cup 13 may be inserted in the recesses such as 11. In the form shown the projecting ends of the pin means 7 may be inclined as indicated at 14 so as to provide an inclined race for the balls 12 so that both radial and end thrust loads will be taken by the balls themselves. If desired, the separable plates 8—8 may be additionally secured in definite spaced relation as by means of a bolt 15 extending through lugs on the plates 8—8.

The hinge connection as herein disclosed may be very readily assembled and disassembled. The securing bolts 10—10, and the bolt 15 when such a bolt is employed, may be removed and one or both of the bearing plates 8—8 separated from the frame. The spring and vehicle frame may then be separated. The assembling is also a simple matter. The spring end and frame are brought into approximately the proper positions and the bearing plates 8—8 then applied and the bolts drawn up tightly to secure the plates 8—8 together with the balls 12 interposed between the bearing means on the spring and the frame. With the antifriction bearings there is substantially no wear, and adjustment of the parts is not ordinarily required, it is therefore desirable to definitely space the bearing plates 8—8 apart as by means of the frame itself or the frame and a filler block 9, so that when the bolts 10—10 are drawn up there will be the desired fit between the antifriction bearing members 12—12 and their respective races. Interchangeability of parts is therefore possible and quantity production facilitated.

In the form shown in Figs. 4 and 5 substantially the same construction is employed, except that the bearing plates 8—8 instead of engaging the vehicle frame 5 directly are secured to an intermediate block 20, as by means of the bolts 10 and the block 20 may be secured to the vehicle frame 5 in any suitable manner as by means of bolts not shown which would extend through the holes 21. With the construction shown in Figs. 4 and 5 the securing block 20 may be made at the factory so as to provide just the proper space between the bearing plates 8—8 so that when the bolts are drawn up there will be just the desired fit between the antifriction bearing members and their races.

With that form of construction illustrated in Figs. 1, 2 and 3, some shimming up or removal of part of the filler block 9 may be required due to variations in the widths of frames as commercially manufactured. However, with the form shown in Figs. 4 and 5, the entire hinge end may be manufactured and assembled at the factory and in order to secure the hinge to the frame it is only necessary to secure the block 20 thereto as heretofore described.

While the invention has been illustrated and described in considerable detail I do not wish to be strictly limited to the forms shown. The principles of the invention are applicable to connecting not only the end of the frame as illustrated to a spring, but also an intermediate part of the frame or in fact, an intermediate part of a spring. It is to be understood that the frame referred to herein may be a separate part such as the block 20 which may be secured to either the spring or the vehicle frame. Many changes may be made within the scope of the invention as defined in the appended claims.

I claim:

1. In a spring end connection, a frame, side plates rigidly secured to said frame and extending therefrom, said side plates having aligned bearing raceways thereon, pin means to be secured to a spring and projecting beyond the sides thereof, said pin means having raceways thereon complementary to said raceways on said side plates, antifriction bearing members seated on said raceways, and auxiliary means for securing said side plates together.

2. In a spring end connection, a frame member, a spring member, side plates, means for rigidly securing said side plates to one of said members in spaced apart relation, said side plates having aligned bearing raceways, means having complementary raceways thereon and carried by the other of said members, antifriction bearing members interposed between the respective raceways on said side plates and said means carried by the other of said members, said side plates being immediately removable from the member carrying the same upon release of said means securing the same to said member.

FRED J. BECHERT.